(12) United States Patent
Hejl et al.

(10) Patent No.: US 12,073,284 B2
(45) Date of Patent: Aug. 27, 2024

(54) CALIBRATION FOR SCANNING DEVICE DECODING BASED ON AIMER PATTERN DETECTION

(71) Applicant: Hand Held Products, Inc., Charlotte, NC (US)

(72) Inventors: Benjamin Hejl, Cherry Hill, NJ (US); David Wilz, Sewell, NJ (US); Erik Van Horn, Seaville, NJ (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 62 days.

(21) Appl. No.: 17/807,080

(22) Filed: Jun. 15, 2022

(65) Prior Publication Data

US 2023/0409853 A1 Dec. 21, 2023

(51) Int. Cl.
*G06K 7/10* (2006.01)
*G06K 7/14* (2006.01)

(52) U.S. Cl.
CPC ....... *G06K 7/10821* (2013.01); *G06K 7/1413* (2013.01)

(58) Field of Classification Search
CPC ........... G06K 7/10821; G06K 7/10881; G06K 7/1413; G06K 2207/1011
USPC ................................. 235/462.2, 462.01, 375
See application file for complete search history.

(56) References Cited

U.S. PATENT DOCUMENTS

| | | | |
|---|---|---|---|
| 7,201,321 B2 | 4/2007 | He et al. | |
| 7,478,753 B2 | 1/2009 | Patel et al. | |
| 8,561,906 B2 | 10/2013 | Rudeen | |
| 2003/0222147 A1* | 12/2003 | Havens | G06K 7/109 235/462.45 |
| 2005/0190914 A1* | 9/2005 | Chen | H04W 12/06 380/201 |
| 2009/0026267 A1* | 1/2009 | Wang | H04N 1/00334 235/440 |
| 2014/0104414 A1* | 4/2014 | McCloskey | G01B 11/2513 348/135 |
| 2020/0242793 A1* | 7/2020 | Fernandez-Dorado | G01B 11/26 |

* cited by examiner

*Primary Examiner* — Edwyn Labaze
(74) *Attorney, Agent, or Firm* — Alston & Bird LLP (57) ABSTRACT

Various embodiments described herein relate to calibration for scanning device decoding based on aimer pattern detection. In this regard, a first image frame captured using a scanning device is decoded. The first image frame is related to an object associated with a barcode. Additionally, a second image frame related to the object associated with the barcode is capture using the scanning device. The second image frame comprises an aimer pattern generated by an aimer of the scanning device. A location of the aimer pattern in the second image frame is determined based on a motion transform correlation between the barcode in the first image frame and the aimer pattern in the second image frame. Additionally, an aiming position of the aimer is calibrated based on the location of the aimer pattern determined by the motion transform correlation.

20 Claims, 6 Drawing Sheets

CALIBRATION FOR SCANNING DEVICE DECODING BASED ON AIMER PATTERN DETECTION

TECHNICAL FIELD

The present disclosure relates generally to imaging systems, and more particularly to data capture and image processing for imagery related to objects of interest.

BACKGROUND

Scanning devices such as, for example, barcode scanners or other sensor devices, are often employed in material handling environments, as well as other environments related to access control, transportation and logistics, etc. However, inefficiencies and/or inaccuracies can occur as a result of factory pre-calibration of the aiming components within the scanning device.

BRIEF SUMMARY

In accordance with an embodiment of the present disclosure, a system comprises a processor and a memory. The memory stores executable instructions that, when executed by the processor, cause the processor to decode a first image frame of first image data captured using a scanning device. The first image frame is related to an object associated with a barcode. The executable instructions, when executed by the processor, also cause the processor to capture, using the scanning device, a second image frame of second image data related to the object associated with the barcode. The second image frame comprises an aimer pattern generated by an aimer of the scanning device. The executable instructions, when executed by the processor, also cause the processor to determine a location of the aimer pattern in the second image frame based on a motion transform correlation between the barcode in the first image frame and the aimer pattern in the second image frame. The executable instructions, when executed by the processor, also cause the processor to calibrate an aiming position of the aimer based on the location of the aimer pattern determined by the motion transform correlation.

In accordance with another embodiment of the present disclosure, a method provides for decoding a first image frame of first image data captured using a scanning device. The first image frame is related to an object associated with a barcode. The method also provides for capturing, using the scanning device, a second image frame of second image data related to the object associated with the barcode. The second image frame comprises an aimer pattern generated by an aimer of the scanning device. The method also provides for determining a location of the aimer pattern in the second image frame based on a motion transform correlation between the barcode in the first image frame and the aimer pattern in the second image frame. The method also provides for calibrating an aiming position of the aimer based on the location of the aimer pattern determined by the motion transform correlation.

In accordance with yet another embodiment of the present disclosure, a computer program product is provided. The computer program product comprises at least one computer-readable storage medium having program instructions embodied thereon, the program instructions executable by a processor to cause the processor to decode a first image frame of first image data captured using a scanning device. The first image frame is related to an object associated with a barcode. The program instructions are also executable by the processor to cause the processor to capture, using the scanning device, a second image frame of second image data related to the object associated with the barcode. The second image frame comprises an aimer pattern generated by an aimer of the scanning device. The program instructions are also executable by the processor to cause the processor to determine a location of the aimer pattern in the second image frame based on a motion transform correlation between the barcode in the first image frame and the aimer pattern in the second image frame. The program instructions are also executable by the processor to cause the processor to calibrate an aiming position of the aimer based on the location of the aimer pattern determined by the motion transform correlation.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Scanning devices such as, for example, barcode scanners or other sensor devices, are often employed in material handling environments such as, for example, distribution centers, shipping centers, warehouses, factories, transportation and logistics environments, etc. Technological advancements have also resulted in the use of data capture devices in other types of environments such as access control for buildings or physical spaces, retail, healthcare, hospitality, etc.

Scanning devices can include aiming components to facilitate image data capture. For example, a scanning device can include one or more aiming devices to facilitate capturing data from a barcode that is associated with a particular object. It is therefore desirable for aiming components within a scanning device to be correctly calibrated for successful image data capture. However, factory-calibrated aiming components in a scanning device are generally only suitable for capturing image data (e.g., barcodes) that fall within a predefined tolerance. Thus, inaccuracies and/or inefficiencies may arise as an object that includes the barcode is moved closer or further away from the factory-calibrated aiming position of the aiming components within the scanning device. Furthermore, lateral and rotational movements of the scanning device itself may also cause the aiming components to fall outside of the factory-calibrated tolerances. An example aiming component is a laser aimer that generates laser aimer patterns (e.g., a laser aimer dot) that can be projected onto or near a barcode associated with an object in order to assist with image data capture. However, successful image data capture still relies on the object and/or scanning device to be within factory-calibrated tolerances even when utilizing laser aimer patterns for image data capture.

Certain types of scanning devices may employ a centering mode for aiming a barcode amongst multiple barcodes grouped closely together. For example, an object undergoing scanning by a scanning device may include multiple barcodes in close proximity of one another and the centering mode can be employed to scan a single barcode from the multiple barcodes. A centering mode generally employs a factory-calibrated position for the location of an aiming component such as, for example, a laser aimer. However, this calibrated position is only accurate for an object at a distance that corresponds to the calibration. As such, as the object that includes a barcode is moved from this calibrated distance, the actual position of the aiming component will differ from the calibration position. Further, scanning devices are generally configured to capture an image without a laser aimer pattern since the laser aimer pattern (e.g., a saturated laser aimer pattern) may interfere with decoding of a barcode.

Thus, to address these and/or other issues related to traditional image data capture by a scanning device, improved calibration for scanning device decoding is disclosed herein. In various embodiments, the calibration for scanning device decoding can be based on aimer pattern detection. In various embodiments, calibration of an aiming position can be provided using correlation of a known position of an aimer pattern (e.g., a laser aimer pattern, a light source aimer pattern, a light-emitting diode (LED) aimer pattern, etc.) within two images. In various embodiments, improved center decode accuracy by aimer detecting after decoding can be provided. For instance, to improve accuracy of a centering mode, an aimer pattern can be captured and detected within the image. Additionally, the aimer pattern can be correlated to a position of a decoded barcode to calibrate an aiming position for the aimer pattern.

In various embodiments, the aimer pattern can be identified in a field of view of the scanning device and the identified aimer pattern can be correlated to an aimer pattern as it relates to a barcode in the field of view to be decoded. Once correlated, the aimer position can be calibrated, or "centered", such that the scanning device can more accurately sight barcodes in the field of view. As such, overall accuracy and efficiency of a scanning device can be increased. Additionally, an amount of time to successfully capture image data and/or decode a barcode can be reduced. In various embodiments, an imager of the scanning device can capture multiple image frames of an object with a barcode present in a field of view of the scanning device. For example, at least a first image frame of first image data related to an object can be captured by the scanning device with the aimer disabled and at least a second image frame of second image data related to the object can be captured by the scanning device with the aimer enabled. Additionally, a location of an aimer pattern in the second image frame can be determined based on a motion transform correlation between the barcode in the first image frame and the aimer pattern in the second image frame.

In various embodiments, calibration of an aiming position with respect to a position of a decoded barcode can be provided. For example, a first image frame of a barcode associated with an object can be captured without the aimer enabled and the barcode can be decoded. Additionally, after successful decoding of the barcode, a second image frame of the barcode containing an aimer pattern can be captured. In certain embodiments, the second image frame can be captured with the aimer enabled during exposure, thus capturing the aimer pattern in the second image frame. Movement between the first image frame containing the barcode and the second image frame containing the aimer pattern can then be calculated. In various embodiments, a motion transform correlation can be determined between the two captured image frames in order to identify the location of the aimer pattern in relation to the barcode and correlate the location information with a known position of the aimer within the scanning device. In certain embodiments, the position of the known aimer pattern can be correlated with the barcode to perform a centering mode and/or to adjust an aiming position of the scanning device based on the detected correlation. In various embodiments, an aimer of the scanning device can be calibrated, or "centered", such that the accuracy of the scanning device is improved, resulting in more efficient decoding of barcodes and resulting in fewer scanning errors. In various embodiments, once the calibration of the aimer has successfully completed, the decoded barcode data can be transmitted and/or further processed.

Figure 1:
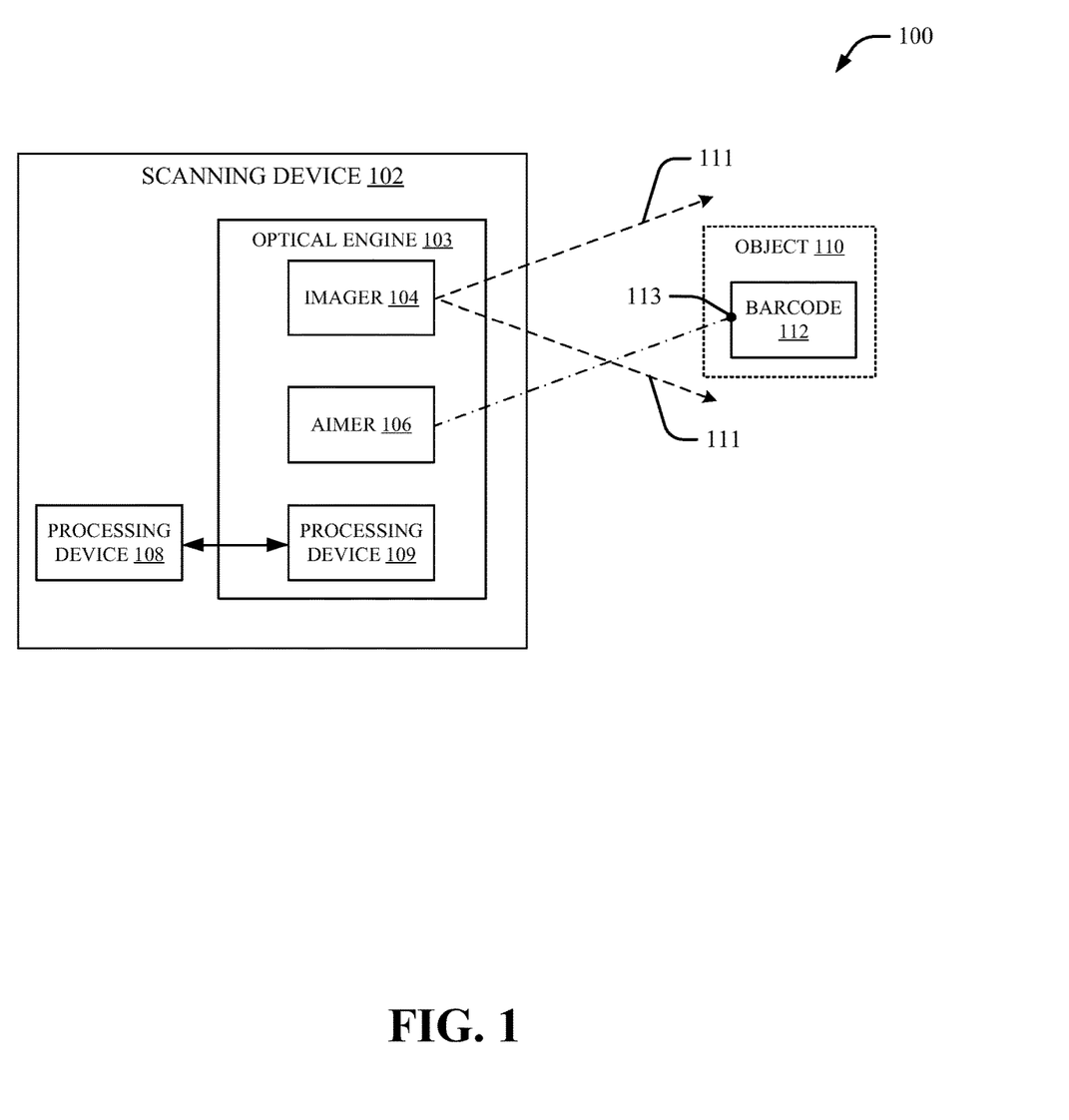
FIG. 1 illustrates a system that provides a scanning device configured for image processing based on aimer position, in accordance with one or more embodiments described herein.

FIG. 1 illustrates a system 100 that provides an exemplary environment within which one or more described features of one or more embodiments of the disclosure can be implemented. The system 100 can be a scanning engine system in a material handling environment such as, for example, a distribution center, a shipping center, a warehouse, a factory, a transportation and logistics environment, or another type of material handling environment. However, it is to be appreciated that the system 100 can be similarly implemented in a different type of environment such as for access control for buildings or physical spaces, retail, healthcare, hospitality, etc. According to an embodiment, the system 100 provides a practical application of image processing with respect to one or more images to facilitate material handling and/or technical applications associated with access control for buildings or physical spaces, retail, healthcare, hospitality, etc.

The system 100 can be related to one or more technologies to facilitate image processing. Moreover, the system 100 can provide an improvement to one or more technologies such as conveyor system technologies, conveyor belt technologies, robotics technologies, sensor systems, material handling technologies, sortation system technologies, mixed stock-keeping unit (SKU) depalletizer technologies, mixed SKU palletizer technologies, industrial technologies, manufacturing technologies, distribution center technologies, warehouse technologies, automation technologies, imaging technologies, asset tracking and monitoring technologies, scanning technologies, digital technologies and/or other technologies.

The system 100 includes a scanning device 102. The scanning device 102 can be a scanner (e.g., a barcode scanner, etc.), a smartphone, a tablet computer, a wearable device, a handheld computing device, an augmented reality device, a virtual reality device, a sensor device, or another type of scanning device capable of capturing imagery. In certain embodiments, the scanning device 102 can be a scan engine device (e.g., a two-dimensional scan engine device or a three-dimensional scan engine device). In one or more embodiments, the scanning device 102 includes an optical engine 103 and a processing device 108. The optical engine 103 includes an imager 104, an aimer 106, and/or a processing device 109. The imager 104 can be configured to obtain two or more frames (e.g., two or more image frames) associated with an object 110 within a field of view 111 of the imager 104. In one or more embodiments, the imager 104 and/or the aimer 106 can be configured as portions of the optical engine 103 that includes light-generating devices, mirroring elements, electronic components, control components, and/or other components configured to obtain images within the field of view 111. In various embodiments, the processing device 109 of the optical engine 103 can be configured with less processing power and/or a smaller physical size as compared to the processing device 108 of the scanning device 102. For example, the processing device 108 of the scanning device 102 can be configured for image processing related to frames captured by the imager 104. Additionally, the processing device 109 of the optical engine 103 can be configured for one or more calculations associated with the imager 104 and/or the aimer 106 that require less processing power than the image processing performed by the processing device 108 of the scanning device 102. The object 110 can be a physical item, a digital item, an element, a device, equipment, or the like. For example, the object 110 can be a package, a parcel, a box, a case, a carton, a pallet, a piece of paper, a digital image, a display screen on a user device, and/or another object.

The object 110 can include at least one barcode 112 to be decoded by the scanning device 102. The aimer 106 can be configured to project an aimer pattern 113 onto the object 110. For example, the aimer 106 can project the aimer pattern 113 onto the barcode 112 associated with the object 110. The aimer 106 can be a laser aimer, a light source aimer, an LED aimer, or another type of aimer configured to project the aimer pattern 113. The aimer pattern 113 can be a laser aimer pattern, a light source aimer pattern, an LED aimer pattern, or another type of aimer pattern projected onto the object 110. In one or more embodiments, the aimer pattern 113 can be configured as a customizable pattern (e.g., a customizable light source pattern) and/or a predefined pattern (e.g., a predefined light source pattern) projected by the aimer 106. The barcode 112 can represent data in a visual machine-readable format. Additionally, the barcode 112 can be configured as a linear barcode (e.g., a one-dimensional barcode), a 2D barcode, a matrix barcode, a quick response (QR) code, or another type of machine-readable symbol configured to represent data in a visual machine-readable format.

The processing device 108 can be configured to execute one or more computing processes related to data capture and/or image processing performed by the scanning device 102. In various embodiments, the processing device 108 can be configured to perform image processing with respect to barcode 112 based on the aimer pattern 113 determined by the processing device 108. In various embodiments, the processing device 108 can improve performance of the scanning device 102. For example, processing device 108 can provide improved efficiency and/or performance for the scanning device 102, improved handling of objects scanned by the scanning device 102, and/or increased speed of transportation of the objects via a material handling system, as compared to conventional material handling systems. Moreover, by performing image processing with respect to barcode 112 based on the aimer pattern 113 determined by the processing device 108, a number of computing resources employed by the processing device 108 can be reduced.

Figure 2:
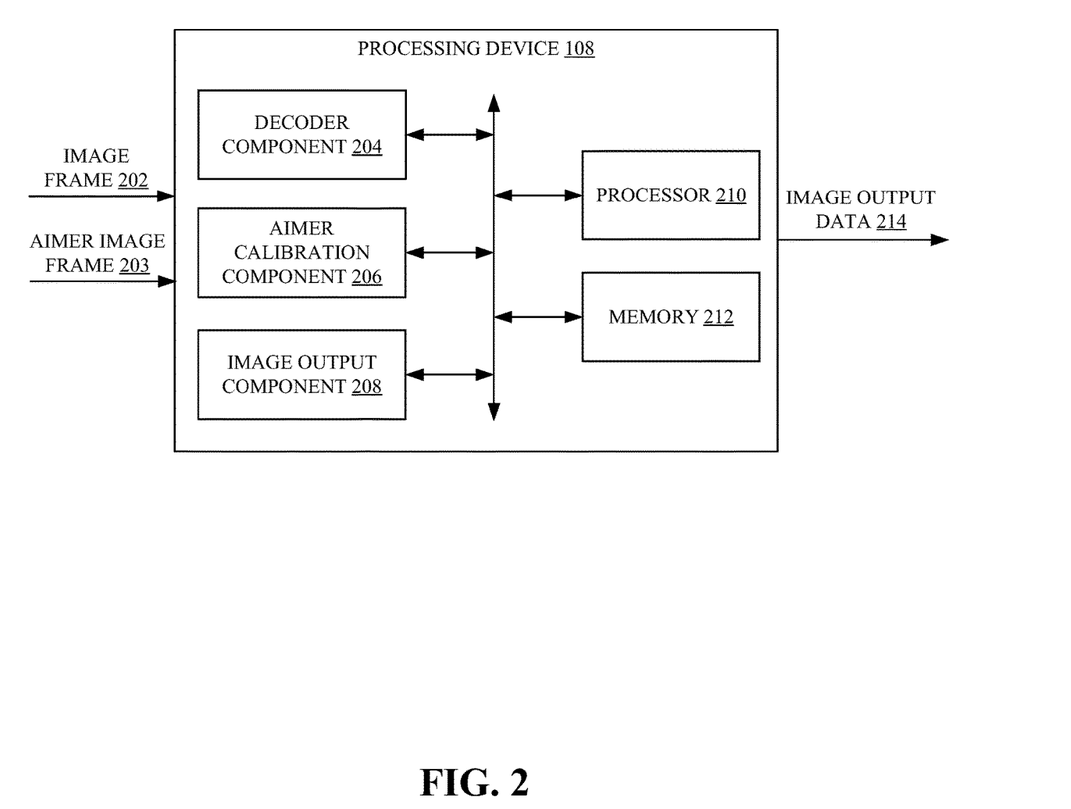
FIG. 2 illustrates an exemplary processing device for calibrating scanning device decoding based on aimer pattern detection, in accordance with one or more embodiments described herein.

FIG. 2 illustrates an exemplary embodiment of the processing device 108 within which one or more described features of one or more embodiments of the disclosure can be implemented. The processing device 108 can include a decoder component 204, an aimer calibration component 206 and/or an image output component 208. Additionally, in certain embodiments, the processing device 108 can include a processor 210 and/or a memory 212. In certain embodiments, one or more aspects of the processing device 108 (and/or other systems, apparatuses and/or processes disclosed herein) can constitute executable instructions embodied within a computer-readable storage medium (e.g., the memory 212). For instance, in an embodiment, the memory 212 can store computer executable component and/or executable instructions (e.g., program instructions). Furthermore, the processor 210 can facilitate execution of the computer executable components and/or the executable instructions (e.g., the program instructions). In an example embodiment, the processor 210 can be configured to execute instructions stored in the memory 212 or otherwise accessible to the processor 210.

The processor 210 can be a hardware entity (e.g., physically embodied in circuitry) capable of performing operations according to one or more embodiments of the disclosure. Alternatively, in an embodiment where the processor 210 is embodied as an executor of software instructions, the software instructions can configure the processor 210 to perform one or more algorithms and/or operations described herein in response to the software instructions being executed. In an embodiment, the processor 210 can be a single core processor, a multi-core processor, multiple processors internal to the processing device 108, a remote processor (e.g., a processor implemented on a server), and/or a virtual machine. In certain embodiments, the processor 210 can be in communication with the memory 212, the decoder component 204, the aimer calibration component 206 and/or the image output component 208 via a bus to, for example, facilitate transmission of data among the processor 210, the memory 212, the decoder component 204, the aimer calibration component 206 and/or the image output component 208. The processor 210 can be embodied in a number of different ways and can, in certain embodiments, include one or more processing devices configured to perform independently. Additionally, or alternatively, the processor 210 can include one or more processors configured in tandem via a bus to enable independent execution of instructions, pipelining of data, and/or multi-thread execution of instructions. The memory 212 can be non-transitory and can include, for example, one or more volatile memories and/or one or more non-volatile memories. In other words, for example, the memory 212 can be an electronic storage device (e.g., a computer-readable storage medium). The memory 212 can be configured to store information, data, content, one or more applications, one or more instructions, or the like, to enable the processing device 108 to carry out various functions in accordance with one or more embodiments disclosed herein. As used herein in this disclosure, the term "component," "system," "device," and the like, can be and/or can include a computer-related entity. For instance, "a component," "a system," "a device," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The processing device 108 can receive an image frame 202 and an aimer image frame 203. The image frame 202 and the aimer image frame 203 can be image frames of image data captured by the scanning device 102. For example, the image frame 202 and the aimer image frame 203 can be image frames of image data captured by the imager 104 of the scanning device 102. The image frame 202 and the aimer image frame 203 can be encoded and/or represented in one or more formats such as JPEG, Bitmap, PNG, RAW, and/or another type of data format. The image frame 202 and the aimer image frame 203 can also respectively include a set of pixels configured as groupings of pixels. In various embodiments, the groupings of pixels for the image frame 202 and the aimer image frame 203 can be mapped into matrix representations. In such embodiments, the matrix values can represent coordinates that relate to the positions of objects in the first and second frames of image data. For example, the relative location of a captured barcode can be expressed as matrix coordinates. Additionally, the location of an aimer pattern can also be expressed in a matrix and its coordinates stored, for example, in processing device 108. In various embodiments, the image frame 202 can be a first image frame related to an object (e.g., the object 110) associated with a barcode (e.g., the barcode 112). Additionally, the aimer image frame 203 can be a second image frame that includes an aimer pattern (e.g., the aimer pattern 113) generated by the aimer 106 of the scanning device 102. In various embodiments, the barcode 112 can be configured as a linear barcode (e.g., a one-dimensional barcode), a 2D barcode, a matrix barcode, a QR code, or another type of machine-readable symbol configured to represent data in a visual machine-readable format.

The decoder component 204 can be configured to decode the image frame 202. For example, the decoder component 204 can perform one or more decoding processes to decode the image frame 202 and/or the barcode 112 included in the image frame 202. In various embodiments, the decoder component 204 can decode the image frame 202 based on a pre-calibrated aiming position of the aimer 106. In certain embodiments, the decoder component 204 can decode encoded data related to the barcode 112 to provide decoded data. The decoded data can be, for example, identifying information and/or data related to the object 110. Additionally, the decoded data can include information such as, but not limited to, numbers, names, descriptions, locations, quantities, statuses, defects, deficiencies, routing data, ownership data, shipping data, fulfillment data, other barcode-related data, and the like. Additionally, in certain embodiments, the decoder component 204 can relay the decoded data to the image output component 208 to be compiled into one or more portions of image output data 214 for transmission by the scanning device 102. In various embodiments, the aimer calibration component 206 can direct the optical engine 103 of the scanning device 102 to capture the aimer image frame 203 with the aimer 106 enabled during exposure such that the aimer image frame 203 comprises the aimer pattern 113. In various embodiments, the aimer calibration component 206 can capture the aimer image frame 203 using the scanning device 102 in response to a determination that the decoding of the image frame 202 satisfies defined criteria such as, for example, that a decoding process is finished, that the barcode 112 is successfully recognized, etc. In various embodiments, the decoder component 204 can select the barcode 112 from a plurality of barcodes on the object 110 (e.g., during a centering mode of the scanning device 102). Additionally, the decoder component 204 can decode a portion of the first image data associated with the barcode 112 and the aimer calibration component 206 can capture the aimer image frame 203 using the scanning device 102 in response to a determination that decoding of the first image data associated with the barcode 112 satisfies the defined criteria.

The aimer calibration component 206 can be configured to perform calibration for scanning device decoding related to the barcode 112. In one or more embodiments, the aimer calibration component 206 can determine a location of the aimer pattern 113 in the aimer image frame 203 based on a motion transform correlation between the barcode 112 in the image frame 202 and the aimer pattern 113 in the aimer image frame 203. Additionally, the aimer calibration component 206 can calibrate an aiming position of the aimer 106 based on the location of the aimer pattern 113 determined by the motion transform correlation. In various embodiments, the aimer calibration component 206 can perform the motion transform correlation in response to a determination, based on an image recognition process with respect to the aimer image frame 203, that the aimer pattern 113 is included in the aimer image frame 203.

The motion transform correlation can determine movement and/or changes with respect to one or more pixels between the image frame 202 and the aimer image frame 203. For example, in various embodiments, the aimer calibration component 206 can determine a location of the aimer pattern 113 in the aimer image frame 203 based on a comparison between respective differences between first pixel data for a first grouping of pixels related to the image frame 202 and second pixel data for a second grouping of pixels related to the aimer image frame 203. Pixel movement can include translation, rotation, or other motion related to pixels. In certain embodiments, the motion transform correlation can correspond to a distance transform correlation with respect to one or more pixels between the image frame 202 and the aimer image frame 203. For example, in certain embodiments, the distance transform correlation can be a distance measure associated with a x-direction translation, a y-direction translation, and/or a z-distance translation with respect to one or more pixels between the image frame 202 aimer image frame 203.

In various embodiments, the motion transform correlation can employ keypoint detection. For example, the aimer calibration component 206 can detect a first set of keypoints in the image frame 202 related to the barcode 112. The first set of keypoints can be a set of interest points related to the barcode 112. In various embodiments, the first set of keypoints can correspond to a set of coordinate points (e.g., x-coordinates, y-coordinates, and/or z-coordinates) related to the barcode 112. Additionally, the aimer calibration component 206 can detect a second set of keypoints in the aimer image frame 203 related to the aimer pattern 113. The second set of keypoints can be a set of interest points related to the aimer pattern 113. In various embodiments, the second set of keypoints can correspond to a set of coordinate points (e.g., x-coordinates, y-coordinates, and/or z-coordinates) related to the aimer pattern 113. In addition, the aimer calibration component 206 can perform the motion transform correlation based on the first set of keypoints related to the barcode 112 and the second set of keypoints related to the aimer pattern 113.

In various embodiments, the aimer calibration component 206 can generate a transform matrix based on the motion transform correlation. The transform matrix can be associated with relative motion between the image frame 202 and the aimer image frame 203. In certain embodiments, the transform matrix can be configured to be applied to the image frame 202 to output the adjusted aimer position. For example, the aimer calibration component 206 can apply the transform matrix to the image frame 202 to determine a degree of calibration for the aiming position of the aimer 106. Additionally or alternatively, the aimer calibration component 206 can configure a centering mode for the scanning device 102 based on the calibrated aiming position of the aimer 106.

In one or more embodiments, the image output component 208 can receive data from the decoder component 204 and/or the aimer calibration component 206 such as, for example, data associated with the decoding of the barcode 112, a decoded version of the barcode 112, data associated with the known position of the aimer 106, data associated with improved calibration settings for the aimer 106, data associated with the location of the aimer pattern 113 as correlated by the motion transform between image frame 202 and aimer image frame 203, and/or a transformed version of the image frame 202 based on the location of the aimer pattern 113 in the aimer image frame 203. In various embodiments, the image output component 208 can compile the data received from the decoder component 204 and/or the aimer calibration component 206 into image output data 214.

In various embodiments, the image output component 208 can transmit the image output data 214 to one or more components of the scanning device 102 and/or one or more devices in communication with the scanning device 102. In various embodiments, the image output component 208 can transmit at least a portion of the image output data 214 in response to a determination that the location of the aimer pattern 113 satisfies a defined degree of tolerance with respect to the barcode 112. In certain embodiments, the image output component 208 can transmit the image output data 214 to provide further data formatting associated with the image output data 214. In various embodiments, the processing device 108 can transmit the image output data 214 to user computing devices through communication channels comprising one or more wired communication channels (e.g., universal serial bus (USB) connections, etc.), wireless communication networks utilizing application programming interface (API) function calls, near-field communication protocols such as Bluetooth®, radio signals, and the like. In various embodiments, the processing device 108 can format the image output data 214 for display on the scanning device 102 and/or via one or more graphical user interfaces of a user computing device.

Figure 3:
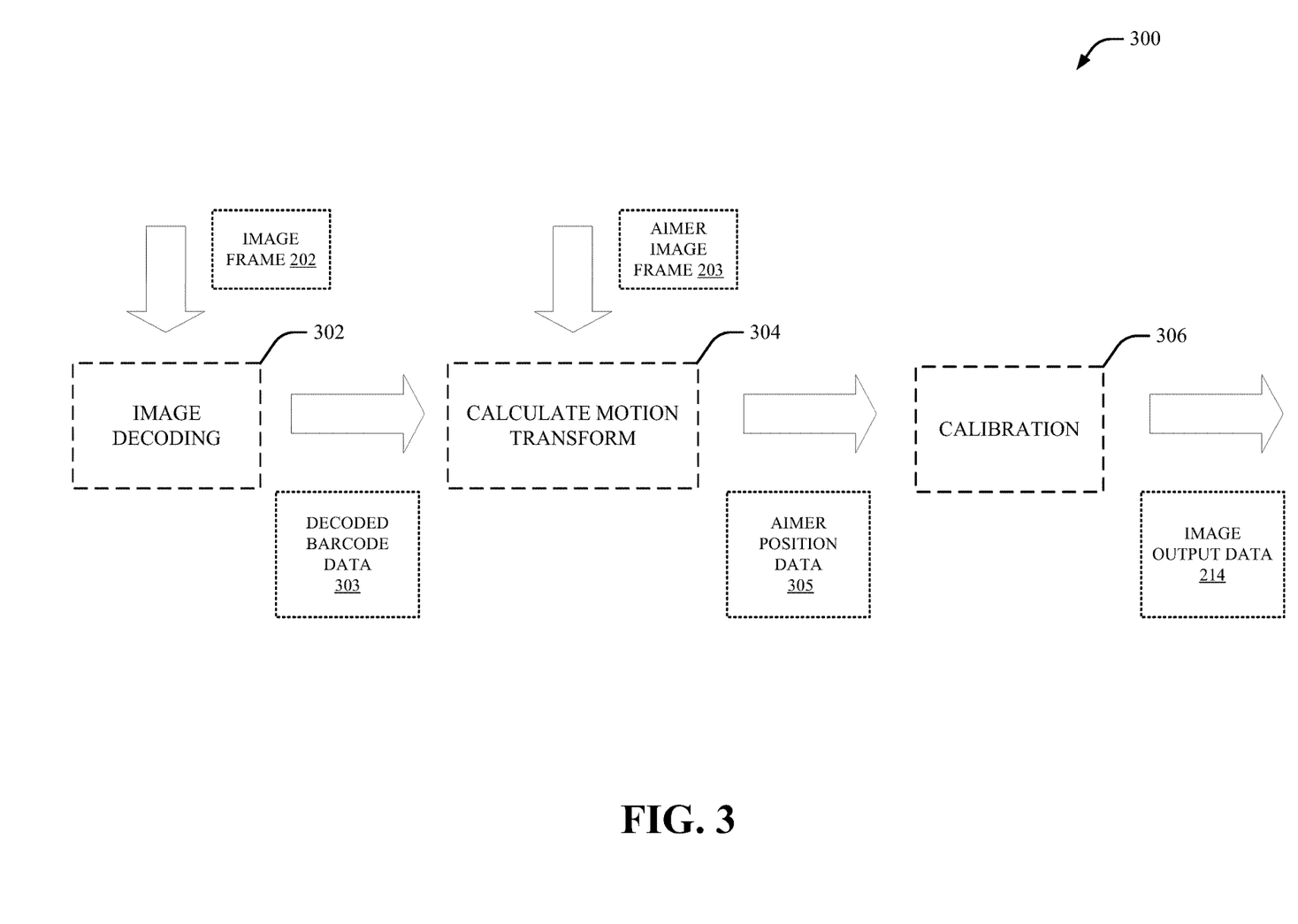
FIG. 3 illustrates a system related to calibrating scanning device decoding based on aimer pattern detection, in accordance with one or more embodiments described herein.

FIG. 3 illustrates a system 300 related to calibration for scanning device decoding based on aimer pattern detection according to one or more embodiments of the disclosure. The system 300 includes a process 302 associated with image decoding and can be configured to decode the image frame 202. The image frame 202 can be captured using a scanning device. Additionally, the image frame 202 can be related to an object associated with a barcode (e.g., the barcode 112). The process 302 can be performed by the processing device 108 (e.g., the decoder component 204) of the scanning device 102. For example, in various embodiments, the process 302 can include one or more processes performed by the decoder component 204, the aimer calibration component 206, and/or the image output component 208. The process 302 can be configured to decode encoded barcode data from barcode 112 to generate decoded barcode data 303 based on image processing with respect to the image frame 202. In various embodiments, the decoded barcode data 303 can be data related to the object 110. In various embodiments, the decoded barcode data 303 can include identifying information and/or data related to the object 110 such as, for example, numbers, names, descriptions, locations, quantities, statuses, defects, deficiencies, routing data, ownership data, shipping data, fulfillment data, other barcode-related data.

The system 300 additionally includes a process 304 associated with calculating a motion transform correlation between two or more image frames (e.g., image frame 202 and aimer image frame 203). The resulting motion transform correlation associated with the process 304 can include data regarding a location of an aimer pattern (e.g., aimer pattern 113) as it relates to the barcode 112 associated with the object 110. In various embodiments, the resulting motion transform correlation associated with the process 304 can include data regarding a location of the aimer pattern 113 in the aimer image frame 203. The process 304 can be performed by the processing device 108 (e.g., the aimer calibration component 206) of the scanning device 102. Additionally, the process 304 can compute aimer position data 305 based on a comparison between the decoded barcode data 303 and the aimer pattern 113 in the aimer image frame 203. The aimer position data 305 can be a correlation between the location of the aimer pattern 113 in the aimer image frame 203 as it relates to the barcode 112 in the image frame 202 based on the motion transform correlation. In various embodiments, the aimer position data 305 comprises a position of the aimer 106, a location of the aimer pattern 113 as is relates to barcode 112 in image frame 202 or aimer image frame 203, a distance of the scanning device 102 from the object 110, and/or an orientation of the scanning device 102. In various embodiments, the process 304 can additionally or alternatively compute the relative coordinates, boundaries, and/or measurements of the barcode 112 captured in the image frame 202 and aimer image frame 203.

The system 300 additionally includes a process 306 associated with calibration of the scanning device 102 and/or the aimer 106 of the scanning device 102. The process 306 can be performed by the processing device 108 (e.g., the aimer calibration component 206) of the scanning device 102. In various embodiments, the process 306 can employ the aimer position data 305 for one or more calibration processes to improve center decode accuracy for the scanning device 102. In various embodiments, the process 306 is associated with calibrating, or "centering", the aimer 106 of the scanning device 102. For example, the process 306 can employ data from the aimer position data 305 in order to calibrate, or recalibrate, the position of the aimer 106. In various embodiments, the process 306 can provide at least a portion of the image output data 214 to, for example, calibrate an aiming position of the aimer 106 based on the location of the aimer pattern included in the aimer position data 305. In one or more embodiments, the process 306 can directs the optical engine 103 to alter an aimer position of the aimer 106 based on the aimer position data 305 in order to improve the center decode accuracy of scanning device 102. In various embodiments, the system 300 of FIG. 3, as employed by the processing device 108, can be configured to compile all data from its respective processes 302, 304, and 306 into image output data 214. The image output data 214 can include the decoded barcode data 303, the aimer position data 305, the motion transform correlation, and/or data from image frame 202 and aimer image frame 203. In one or more embodiments, the processing device 108 can transmit the image output data 214 to one or more other components of the scanning device 102 and/or one or more user computing devices.

Figure 4:
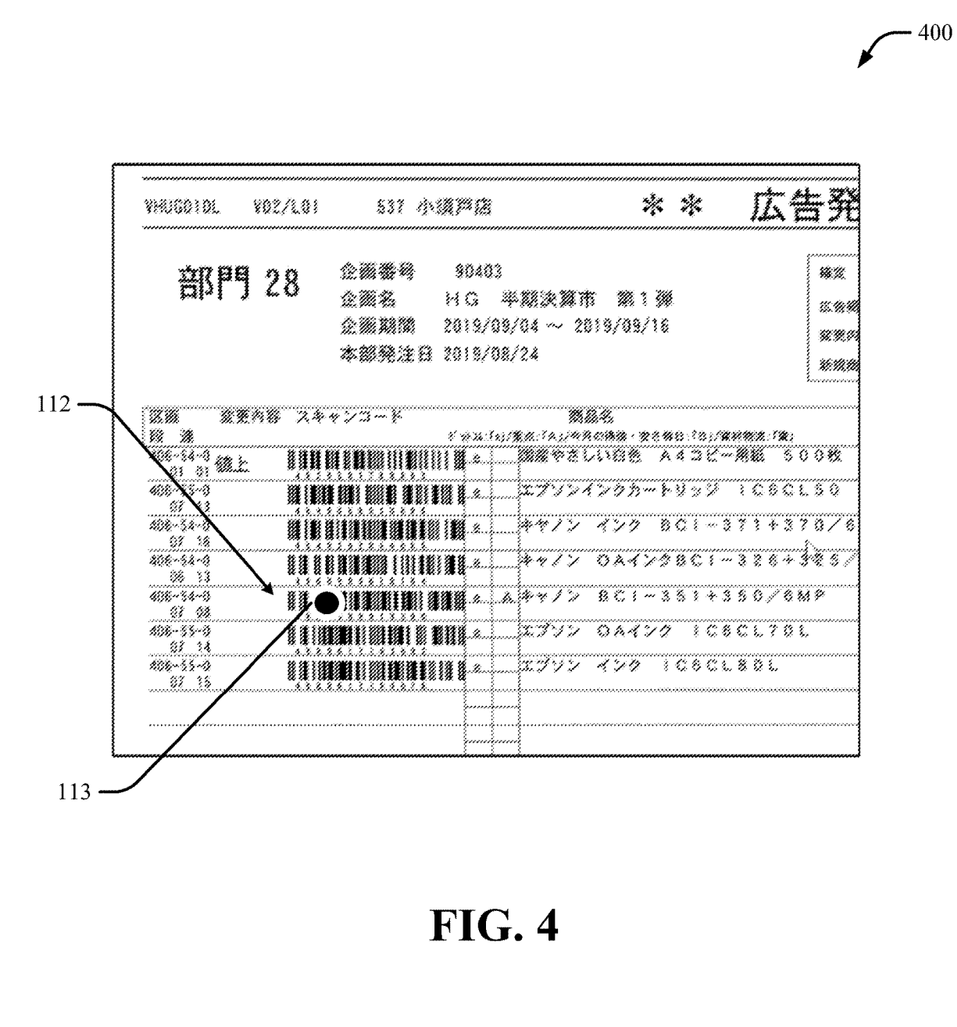
FIG. 4 illustrates an exemplary image, in accordance with one or more embodiments described herein.

FIG. 4 illustrates an image 400 according to one or more embodiments of the disclosure. The image 400 can be an image captured by the scanning device 102. For example, the image 400 can be an image captured by the imager 104 of the scanning device 102. The image 400 can be encoded and/or represented in one or more formats such as JPEG, Bitmap, PNG, RAW, and/or another type of data format. The image 400 can also respectively include a set of pixels configured as a grouping of pixels. In one or more embodiments, the scanning device 102 (e.g., the imager 104 of the scanning device 102) can capture the image 400 using the aimer pattern 113 via the aimer 106. For instance, the image 400 can include the barcode 112 and the aimer pattern 113 employed by the aimer 106 to locate and/or identify the barcode 112. In this regard, in one or more embodiments, the image 400 can correspond to the aimer image frame 203.

Figure 5:
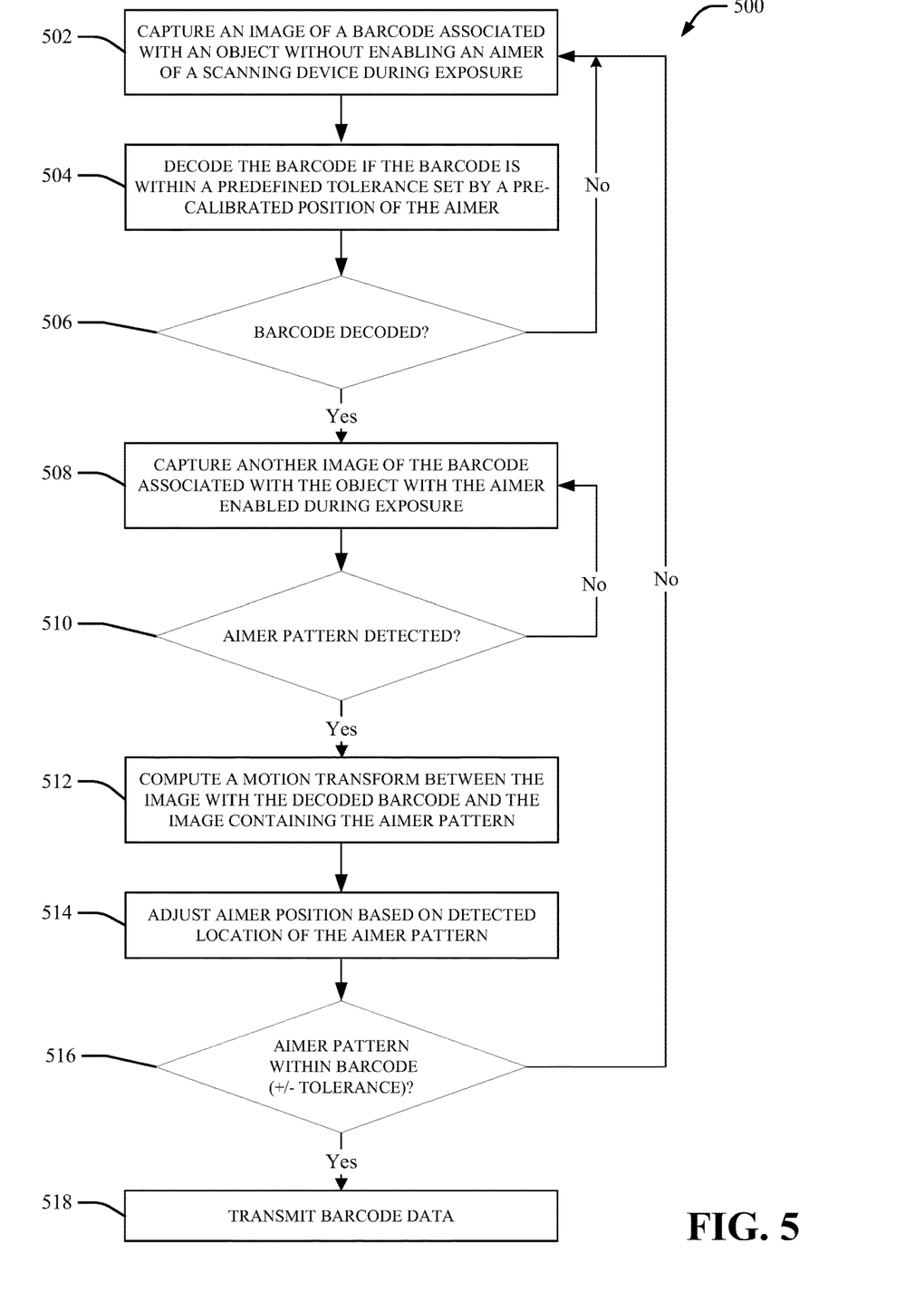
FIG. 5 illustrates a flow diagram for calibrating scanning device decoding based on aimer pattern detection, in accordance with one or more embodiments described herein.

FIG. 5 illustrates a computer-implemented method 500 for calibrating scanning device decoding based on aimer pattern detection in accordance with one or more embodiments described herein. In one or more embodiments, the computer-implemented method 500 can be employed by the processing device 108. In various embodiments, the computer-implemented method 500 provides for calibrating, or "centering", an aimer (e.g., the aimer 106 of scanning device 102) so as to improve the center decode accuracy of the scanning device after decoding a barcode (e.g., barcode 112 associated with object 110). In one or more embodiments, the computer-implemented method 500 begins at step 502 where an image of a barcode is captured by a scanning device without enabling an aimer of a scanning device during exposure. For example, a barcode 112 can be captured in the image frame 202 by the scanning device 102) without enabling the aimer 106.

The computer-implemented method 500 also includes a step 504 where the barcode is decoded if the barcode is within a predefined tolerance set by a pre-calibrated position of the aimer. The computer-implemented method 500 also includes a step 506 that determines whether the barcode from step 504 has been successfully decoded. In various embodiments, a successfully decoded barcode can be formatted for transmission with a successfully recognized barcode. In various embodiments, if the barcode is not decoded (e.g., the barcode was not successfully decoded), the computer-implemented method 500 can return to step 502 to re-capture an image of the barcode associated with the object without enabling the aimer. Alternatively, if the barcode is decoded (e.g., the barcode is successfully decoded), the computer-implemented method 500 can proceed to step 508. At step 508, another image frame of the barcode associated with the object is captured with the aimer enabled during exposure. For example, the aimer 106 can be enabled and can project the aimer pattern 113 (e.g., a laser dot, etc.) onto or near the barcode 112 associated with object 110 such that the aimer pattern 113 is captured in the aimer image frame 203.

The computer-implemented method 500 also includes a step 510 to determine whether an aimer pattern is detected. For example, the step 510 can determine whether an aimer pattern is detected within the other image frame captured at step 508. In certain embodiments, image recognition can be employed to detect the aimer pattern 113 in the other image frame captured at step 508. In various embodiments, once the captured image data containing the aimer pattern is processed, a search can be performed. In certain embodiments, the aimer image frame 203 can be searched for stored images of known aimer patterns (e.g., a dot or a crosshair) and, once located, the coordinates of the aimer pattern 113 can be stored in memory (e.g., memory 212). In alternative embodiments, an aimer pattern can be determined in the other image frame based on a comparison between respective differences between the first pixel data for the first grouping of pixels and the second pixel data for the second grouping of pixels. In response to a determination that an aimer pattern is not detected, the computer-implemented method returns to step 508 to re-capture another image of the barcode associated with the object with the aimer enabled during exposure. However, in response to a determination that the aimer pattern is detected, the computer-implemented method proceeds to step 512.

At step 512, a motion transform between the image with the decoded barcode and the image containing the aimer pattern is computed. For example, a motion transform correlation can be performed in response to a determination, based on an image recognition process with respect to other image frame captured at step 508, that the aimer pattern is included in the other image frame. In various embodiments, the motion transform correlation can be calculated between the image with the decoded barcode from step 502 (e.g., image frame 202) and the other image containing the aimer pattern from step 508 (e.g., aimer image frame 203). The results of the motion transform correlation can be employed, for example, by the processing device 108 to compute the location of the aimer pattern 113 as it relates to the barcode. Additionally, the known position of the aimer (e.g., the aimer 106) in the scanning device is correlated with the aimer pattern as it relates to the barcode in the motion transform correlation. For example, the orientation and/or position of the aimer 106 in the scanning device 102 can be correlated with the location of the aimer pattern 113 as it relates to the barcode 112 of the resulting motion transform between the image frame 202 and the aimer image frame 203.

The computer-implemented method 500 also includes a step 514 that adjusts aimer position based on detected location of the aimer pattern. For example, an aimer position of the aimer (e.g., the aimer 106) can be adjusted based on the detected location of the aimer pattern 113 determined in step 512. In various embodiments, the aiming position of the aimer can be calibrated, or "centered", based on the location of the aimer pattern determined by the motion transform correlation of step 512. For example, the aimer calibration component 206 of the processing device 108 can direct the optical engine 103 to change or alter the orientation of the aimer 106 based on the motion transform correlation between the original position of the aimer 106 and the aimer pattern 113 as it relates to the barcode 112 determined in step 508 so as to improve the accuracy and efficiency of scanning device 102.

The computer-implemented method 500 also includes a step 516 that determines whether the aimer pattern is within a certain tolerance with respect to the barcode. For example, step 516 can determine whether the aimer is sighted within a predefined tolerance and/o whether the aimer pattern is projecting onto or near a barcode within an acceptable proximity tolerance. In various embodiments, if a calibration process related to step 514 causes the aimer 106 of scanning device 102 to re-position itself outside of an acceptable tolerance, the aimer pattern can be determined to exceed the certain tolerance with respect to the barcode. Additionally, the check related to step 516 may fail if the aimer pattern 113, when projected onto or near the barcode 112, falls outside of the accepted proximity tolerance after calibration. In response to a determination that the aimer pattern is not within the certain tolerance with respect to the barcode (e.g., if it is determined that the aimer position and/or the aimer pattern projection fail to meet the predefined tolerances), the computer-implemented method 500 can return to step 502 where an image is re-captured without enabling the aimer. However, in response to a determination that the aimer pattern is within the certain tolerance with respect to the barcode, the computer-implemented method 500 proceed to step 518.

At step 518, barcode data is transmitted. For example, in response to a determination that the location of the aimer pattern satisfies a defined degree of tolerance with respect to the barcode, the processing device 108 can transmit at least a portion of image data associated with the barcode. Additionally or alternatively, in various embodiments, the processing device 108 can transmit at least a portion of the image output data 214 associated with the decoded barcode data 303, the aimer position data 305, the calculated motion transform, and/or data from image frame 202 and aimer image frame 203.

Figure 6:
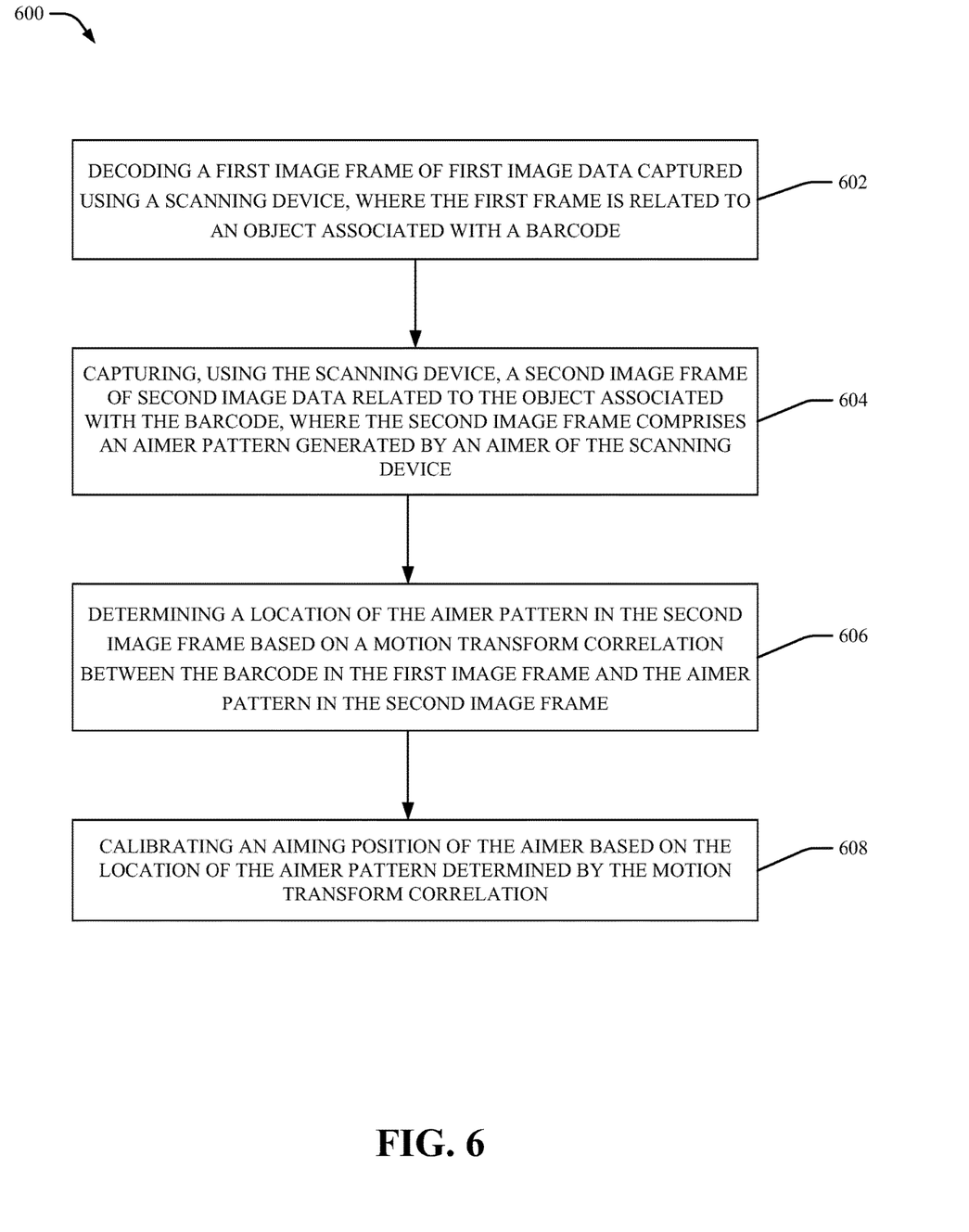
FIG. 6 illustrates another flow diagram for calibrating scanning device decoding based on aimer pattern detection, in accordance with one or more embodiments described herein.

FIG. 6 illustrates a computer-implemented method 600 for calibrating scanning device decoding based on aimer pattern detection in accordance with one or more embodiments described herein. In one or more embodiments, the computer-implemented method 600 can be performed by the processing device 108. In one or more embodiments, the computer-implemented method 600 begins with decoding a first image frame of first image data captured using a scanning device, where the first frame is related to an object associated with a barcode (step 602). In one or more embodiments, the first frame of image data is captured by the scanning device without an aimer enabled during exposure. For example, image frame 202 is captured by scanning device 102 without enabling the aimer 106 to generate a aimer pattern 113 during exposure. Additionally, processing device 108 decodes the encoded data stored in the barcode captured in the image frame (e.g., barcode 112). The encoded data can be identifying information and data related to the object comprising numbers, names, descriptions, locations, quantities, statuses, defects, deficiencies, routing data, ownership data, shipping data, fulfillment data, and/or other barcode-related data.

In one or more embodiments, decoding the first image frame of first image data comprises selecting the barcode from a plurality of barcodes on the object, decoding a portion of the first image data associated with the barcode, and/or capturing the second image frame using the scanning device in response to a determination that decoding of the first image data associated with the barcode satisfies defined criteria.

The computer-implemented method 600 further includes capturing, using the scanning device, a second image frame of second image data related to the object associated with the barcode, where the second image frame comprises an aimer pattern generated by an aimer of the scanning device (step 604). For example, scanning device 102 can enable the aimer 106 which generates a aimer pattern 113 such that the aimer pattern 113 and the barcode 112 associated with the object 110 is captured in the aimer image frame 203.

In one or more embodiments, the image frame 202 and the aimer image frame 203 can respectively include a set of pixels configured as groupings of pixels. The groupings of pixels for the image frame 202 and the aimer image frame 203 can be mapped into a matrix representation. In such embodiments, the matrix values can represent coordinates that relate to the positions of objects in the first and second image frames. For example, the relative location of a captured barcode can be expressed as matrix coordinates. Additionally, the location of an aimer pattern can also be expressed in a matrix and its coordinates stored, for example, in processing device 108.

The computer-implemented method 600 further includes determining a location of the aimer pattern in the second image frame based on a motion transform correlation between the barcode in the first image frame and the aimer pattern in the second image frame (step 606). For instance, the location of aimer pattern 113 can be determined based a motion transform correlation between the image frame 202 and the aimer image frame 203. In certain embodiments, the aimer pattern can be identified and located in a frame of image data using one or more image recognition techniques. For instance, once the captured image data containing the aimer pattern is processed, a search for a predefined aimer pattern can be performed. In certain embodiments, the aimer image frame 203 can be analyzed to determine whether the aimer pattern matches one or more stored images of known aimer patterns (e.g., a dot or a crosshair) and, once located, the coordinates of the aimer pattern 113 can be stored in memory (e.g., memory 212). In alternative embodiments, a location of an aimer pattern can be determined in the second image frame based on a comparison between respective differences between the first pixel data for the first grouping of pixels and the second pixel data for the second grouping of pixels. In certain embodiments, the location of the aimer pattern in the second image frame can be determined based on a distance transform correlation between the barcode in the first image frame and the aimer pattern in the second image frame. For example, in certain embodiments, the motion transform correlation can correspond to a distance transform correlation with respect to one or more pixels between the first image frame and the second image frame.

Additionally, the computer-implemented method 600 can correlate an aiming position of the aimer in the scanning device with the location of the aimer pattern as it relates to the barcode in the motion transform. In certain embodiments, executable instructions stored in the processing device (e.g., processing device 108) can cause the processor to compute the motion transform between the first frame of image data and the second image frame using a keypoint detection algorithm to detect areas of interest such as barcode 112. For example, the processing device 108 can detect a first set of keypoints in the first image frame related to the barcode, detect a second set of keypoints in the second image frame related to the aimer pattern and perform the motion transform correlation based on the first set of keypoints related to the barcode and the second set of keypoints related to the aimer pattern. Furthermore, the executable instructions can cause the processing device to correlate the keypoints between the first and second image frames of image data and calculate the relative motion between the first frame and the second image frame to generate a transform matrix. In various embodiments, the results of the motion transformation calculations can be employed to correlate the position of the aimer in the scanning device (e.g., aimer 106) with the transform matrix coordinates of the aimer pattern (e.g., aimer pattern 113). Additionally, the transform matrix can be applied to the first image frame to determine a degree of calibration for the aiming position of the aimer. In various embodiments, the degree of calibration for the aiming position of the aimer can be checked against predefined aiming tolerances to provide improved accuracy and/or efficiency for the scanning device.

The computer-implemented method 600 further includes calibrating an aiming position of the aimer based on the location of the aimer pattern determined by the motion transform correlation (step 608). In various embodiments, the correlation between the aiming position of the aimer and the location of the aimer pattern in relation to the barcode in the image frame can be employed to calibrate the position of the aimer. For example, the aimer calibration component 206 of the processing device 108 can direct the optical engine 103 to change or alter the orientation of the aimer 106 based on the correlation between the original position of the aimer 106 and the aimer pattern 113 as it relates to the barcode 112 of the motion transform correlation to improve accuracy and/or efficiency of scanning device 102. Furthermore, in one or more embodiments, the aimer calibration component 206 can additionally or alternatively configure a centering mode for the scanning device based on the calibrated aiming position of the aimer.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system, comprising:
a processor; and
a memory that stores executable instructions that, when executed by the processor, cause the processor to:
decode a barcode in a first image frame of first image data captured using a scanning device, wherein the first image frame is related to an object associated with the barcode;
capture, using the scanning device, a second image frame of second image data related to the object associated with the barcode, wherein the second image frame comprises an aimer pattern generated by an aimer of the scanning device;
determine a motion transform correlation between the barcode in the first image frame and the aimer pattern in the second image frame; and
adjust an aiming position of the aimer based on the motion transform correlation and determine if a location of the decoded barcode in the first image frame is within a predefined tolerance of the aimer pattern in the second image frame.

2. The system of claim 1, wherein the executable instructions further cause the processor to:
decode the first image frame based on a pre-calibrated aiming position of the aimer.

3. The system of claim 1, wherein the executable instructions further cause the processor to:
capture the second image frame using the scanning device in response to a determination that the decoding of the barcode in the first image frame satisfies defined criteria.

4. The system of claim 1, wherein the executable instructions further cause the processor to:
in response to a determination that the location of the decoded barcode in the first image frame is within the predefined tolerance of the aimer pattern in the second image frame, transmit at least a portion of the first image data associated with the barcode.

5. The system of claim 1, wherein the executable instructions further cause the processor to:
perform the motion transform correlation in response to a determination, based on an image recognition process with respect to the second image frame, that the aimer pattern is included in the second image frame.

6. The system of claim 1, wherein the executable instructions further cause the processor to:
detect a first set of keypoints in the first image frame related to the barcode;
detect a second set of keypoints in the second image frame related to the aimer pattern; and
perform the motion transform correlation based on the first set of keypoints related to the barcode and the second set of keypoints related to the aimer pattern.

7. The system of claim 1, wherein the executable instructions further cause the processor to:
generate, based on the motion transform correlation, a transform matrix associated with a relative motion between the first image frame and the second image frame; and
apply the transform matrix to the first image frame to determine a degree of calibration for the aiming position of the aimer.

8. The system of claim 1, wherein the executable instructions further cause the processor to:
select the barcode from a plurality of barcodes on the object;
decode a portion of the first image data associated with the barcode; and
capture the second image frame using the scanning device in response to a determination that decoding of the first image data associated with the barcode satisfies defined criteria.

9. The system of claim 1, wherein the executable instructions further cause the processor to:
configure a centering mode for the scanning device based on the aiming position of the adjusted aimer.

10. The system of claim 1, wherein the aimer pattern is configured as a customizable pattern.

11. The system of claim 1, wherein the executable instructions further cause the processor to:
determine a distance transform correlation between the barcode in the first image frame and the aimer pattern in the second image frame.

12. A method, comprising:
decoding a barcode in a first image frame of first image data captured using a scanning device, wherein the first image frame is related to an object associated with the barcode;
capturing, using the scanning device, a second image frame of second image data related to the object associated with the barcode, wherein the second image frame comprises an aimer pattern generated by an aimer of the scanning device;
determining a motion transform correlation between the barcode in the first image frame and the aimer pattern in the second image frame; and
adjusting an aiming position of the aimer based on the motion transform correlation and determine if a location of the decoded barcode in the first image frame is within a predefined tolerance of the aimer pattern in the second image frame.

13. The method of claim 12, wherein decoding the barcode in the first image frame further comprises:
decoding the first image frame based on a pre-calibrated aiming position of the aimer.

14. The method of claim 12, wherein capturing the second image frame further comprises:
capturing the second image frame using the scanning device in response to a determination that the decoding of the barcode in the first image frame satisfies defined criteria.

15. The method of claim 12, further comprising:
in response to a determination that the location of the decoded barcode in the first image frame is within the predefined tolerance of the aimer pattern in the second image frame, transmitting at least a portion of the first image data associated with the barcode.

16. The method of claim 12, wherein determining the location of the aimer pattern in the second image frame further comprises:
performing the motion transform correlation in response to a determination, based on an image recognition process with respect to the second image frame, that the aimer pattern is included in the second image frame.

17. The method of claim 12, wherein determining the location of the aimer pattern in the second image frame further comprises:
detecting a first set of keypoints in the first image frame related to the barcode;
detecting a second set of keypoints in the second image frame related to the aimer pattern; and performing the motion transform correlation based on the first set of keypoints related to the barcode and the second set of keypoints related to the aimer pattern.

18. The method of claim 12, wherein determining the location of the aimer pattern in the second image frame further comprises:
   generating, based on the motion transform correlation, a transform matrix associated with a relative motion between the first image frame and the second image frame; and
   applying the transform matrix to the first image frame to determine a degree of calibration for the aiming position of the aimer.

19. The method of claim 12, wherein decoding the first image frame of first image data further comprises:
   selecting the barcode from a plurality of barcodes on the object;
   decoding a portion of the first image data associated with the barcode; and
   capturing the second image frame using the scanning device in response to a determination that decoding of the first image data associated with the barcode satisfies defined criteria.

20. A computer program product comprising at least one computer-readable storage medium having program instructions embodied thereon, the program instructions executable by a processor to cause the processor to:
   decode a barcode in a first image frame of first image data captured using a scanning device, wherein the first image frame is related to an object associated with the barcode;
   capture, using the scanning device, a second image frame of second image data related to the object associated with the barcode, wherein the second image frame comprises an aimer pattern generated by an aimer of the scanning device;
   determine a motion transform correlation between the barcode in the first image frame and the aimer pattern in the second image frame; and
   adjust an aiming position of the aimer based on the motion transform correlation and determine if a location of the decoded barcode in the first image frame is within a predefined tolerance of the aimer pattern in the second image frame.

* * * * *